United States Patent [19]

Choi

[11] Patent Number: 5,227,868
[45] Date of Patent: Jul. 13, 1993

[54] CIRCUIT FOR MIXING SUPERIMPOSED VIDEO SIGNAL AND CHARACTER DISPLAYING SIGNAL

[75] Inventor: Wan-Seong Choi, Suweon, Rep. of Korea

[73] Assignee: Samsung Electronics Co., Ltd., Suwon, Rep. of Korea

[21] Appl. No.: 704,105

[22] Filed: May 22, 1991

[30] Foreign Application Priority Data

May 31, 1990 [KR] Rep. of Korea .................... 90-7766

[51] Int. Cl.⁵ .............................................. H04N 9/74
[52] U.S. Cl. ........................................ 358/22; 358/17
[58] Field of Search .......................................... 358/22

[56] References Cited
U.S. PATENT DOCUMENTS 5,031,043 7/1991 Rocco et al. ........................ 358/22

Primary Examiner—James J. Groody
Assistant Examiner—Minsun Oh
Attorney, Agent, or Firm—Robert E. Bushnell

[57] ABSTRACT

A circuit for mixing superimposed video signal and character displaying signal comprises a video signal processing unit, superimposed video signal generator, character displaying signal generator, microprocessor, and mixer, wherein the superimposed video signal generator comprises a controller for controlling the input and output signals according to the composite video signal of the video signal processing unit and the control signal of the microprocessor, memory a for storing the superimposed video signal by the output signal of the controller so as to apply desired information to the controller according to the control signal of the microprocessor, chrominance signal generator for receiving the superimposed video signal read out from the memory and color information from the microprocessor through the controller so as to generate the chrominance signal, and luminance signal generator for receiving the output signals of the chrominance signal generator and controller and mixing the superimposed video signal and character displaying signal of the character displaying signal generator, the mixed signal being applied to the mixer.

2 Claims, 4 Drawing Sheets

CIRCUIT FOR MIXING SUPERIMPOSED VIDEO SIGNAL AND CHARACTER DISPLAYING SIGNAL

TECHNICAL BACKGROUND

The present invention concerns a circuit for mixing superimposed video signal and character display signal.

Generally, a video signal processing apparatus such as a video tap recorder, camcorder, etc. employs circuit for superimposing video signals and a character generator (CG) in order to obtain character displaying information. The circuit for superimposing video signals and the CG serve to insert characters and figures of a desired shape on the screen of a video display. In this case, the circuit for superimposing video signals may randomly establish the position and shape of desired character information per frame, while the CG may only establish limited characters and figures predetermined by a microcomputer.

A conventional circuit for superimposing video signals is disclosed in Japanese Laid-Open Patent Publication Sho 62-298278, which disclosed a circuit for superimposing two frames.

Referring to FIG. 1 for illustrating a conventional circuit generating character display information, a composite video signal produced by video signal processing unit 100 is applied to the superimposed video signal generator 200 so that the superimposed video signal corresponding to each frame is stored into a memory thereof. Meanwhile, the composite video signal of the video signal processing circuit 100 is also applied to mixer MIX1. Thereafter, if an interval is reached during which the composite video signal is not applied to the mixer, the memory of the superimposed video signal generator 200 is read by the mixer MIX1 which applies the composite video signal loaded with the superimposed video signal to mixer MIX2. The CG 300 controlled by a microprocessor separates character displaying information into recording and displaying information which is respectively applied to mixers MIX2 and MIX3. Thus if the recording information from the CG 300 is not applied to the mixer MIX2, the mixer MIX2 causes the composite video signal loaded with the superimposed video signal to be transferred to tape recording unit. However, if the recording information from the CG 300 is applied to the mixer MIX2, it is transferred to the tape recording unit. If not applied with the displaying information from the CG 300, the mixer MIX3 causes the output signal of the mixer MIX2 to be applied to video displaying unit. However, if the displaying information from the CG 300 is applied to the mixer MIX3, it is transferred to the video displaying unit. Thus, such a conventional mixing circuit separately processes recording and displaying information output signal of the CG 300, so that the circuit construction is complicated and a plurality of mixers are required, thus increasing the noise.

SUMMARY OF THE INVENTION

It is an object of the present invention to provide a superimposed video signal generator to process the recording information of the CG, whereby the circuit construction is simplified and the number of mixers is reduced, thus decreasing noise.

According to the present invention, a circuit for mixing a superimposed video signal and a character displaying signal comprises a video signal processing unit, a superimpsoed video signal generator, character displaying signal generator a microprocessor, and mixer, wherein the superimposed video signal generator further comprises a controller for controlling input and output signals according to the composite video signal of the microprocessor, a memory for storing the superimposed video signal in response to of the controller so as to apply desired information to the controller according to the control signal of the microporcessor, chrominance signal generator for receiving the superimposed video signal read out from the memory and color information from the microprocessor through the controller so as to generate the chrominance signal, and luminance signal generator for receiving the output signals of the chrominance signal generator and controller so as to mix the superimposed video signal and character displaying signal of the character displaying signal generator, the mixed signal being applied to the mixer.

The present invention will not be described more specifically with reference to the drawings attached, only by way of example.

BRIEF DESCRIPTION OF THE ATTACHED DRAWINGS

DETAILED DESCRIPTION OF A CERTAIN PREFERRED EMBODIMENT

Figure 1:
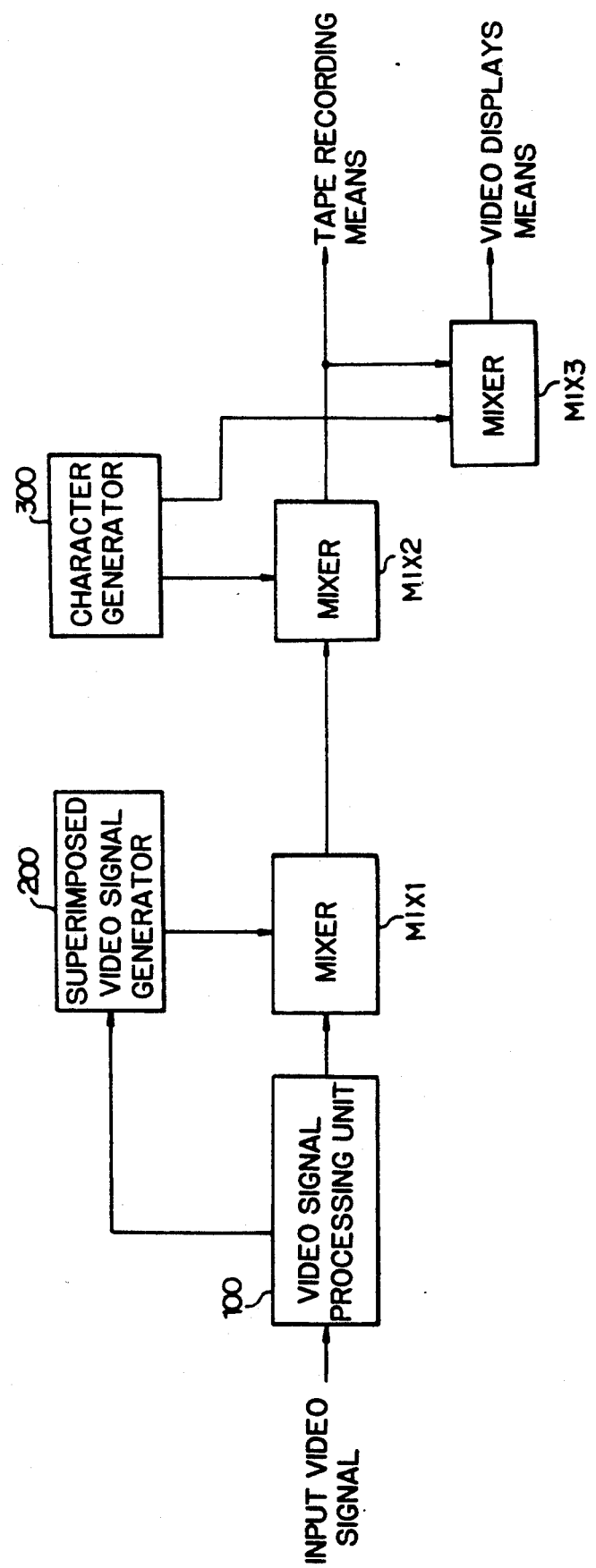
FIG. 1 is a conventional circuit diagram.
Figure 2:
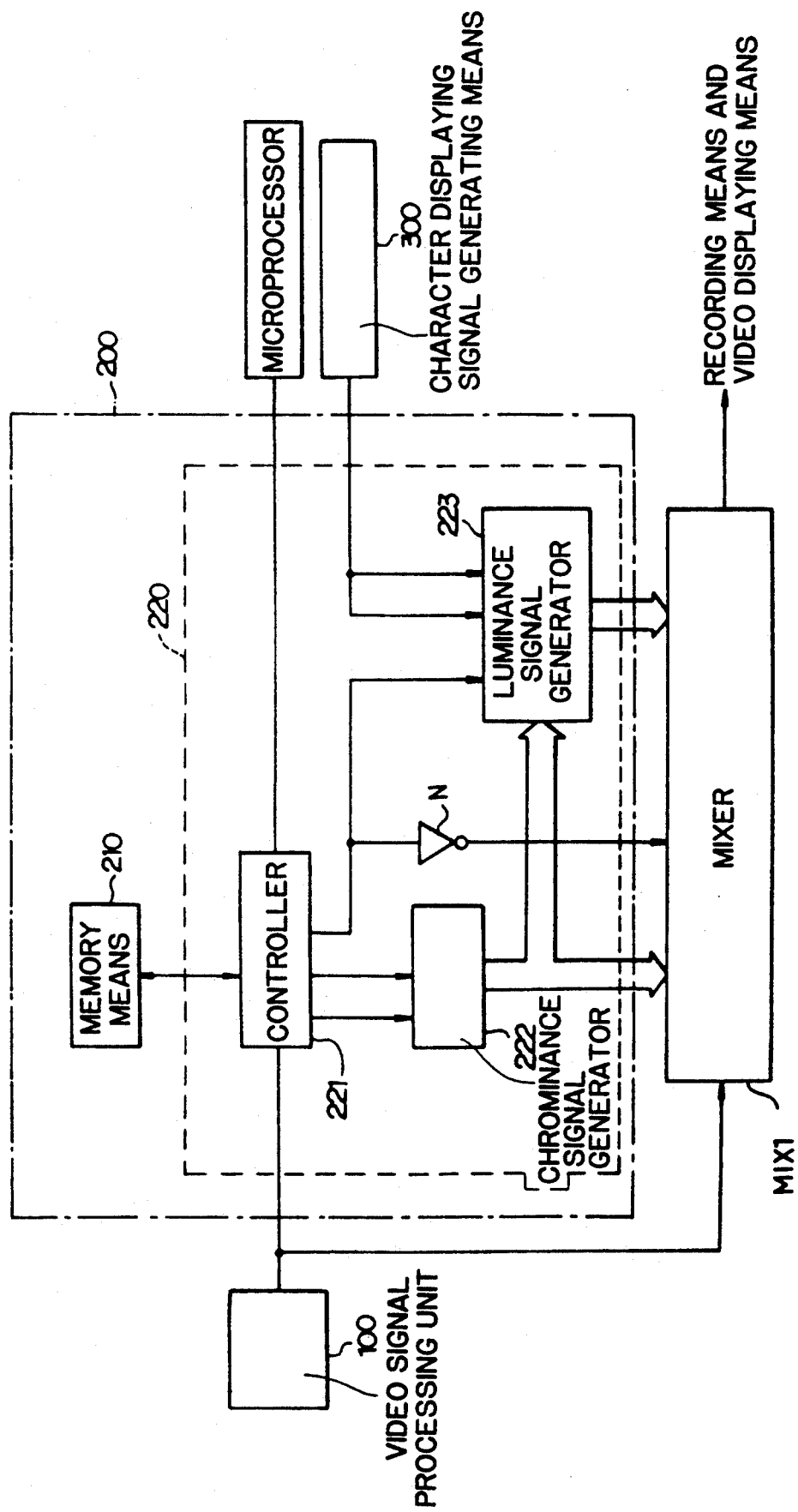
FIG. 2 is a circuit diagram for illustrating superimposed video signal generating means used in the inventive circuit.

Referring to FIG. 2, memory 210 receives the output signal of superimposed video signal generator 220 so as to store suprimposed video signal information, and delivers desired information to the superimposed video signal generator 220 according to the control signal from a microprocessor 400. The superimposed video signal generator 220 further comprises a controller 221 for controlling input and output signals according to the composite video signal of the video signal processing unit 100 and a control signal of the microprocessor, chromiance signal generator 222 for receiving the superimposed video signal read out from the memory 210 and color information from the microprocessor through the controller 221 so as to generate the chrominance signal, and luminace signal generator 223 for receiving the output signals of the chrominance signal generator 222 and controller 221 so as to mix the superimposed video signal and character displaying signal of the character displaying signal generator 300. The mixed signal is applied to the mixer MIX1.

The mixer MIX1 receives the output signals of the video signal processing unit 100 and superimposed video signal generator 200, and delivers the output signal to the tape recording unit and the video displaying unit.

Figure 3:
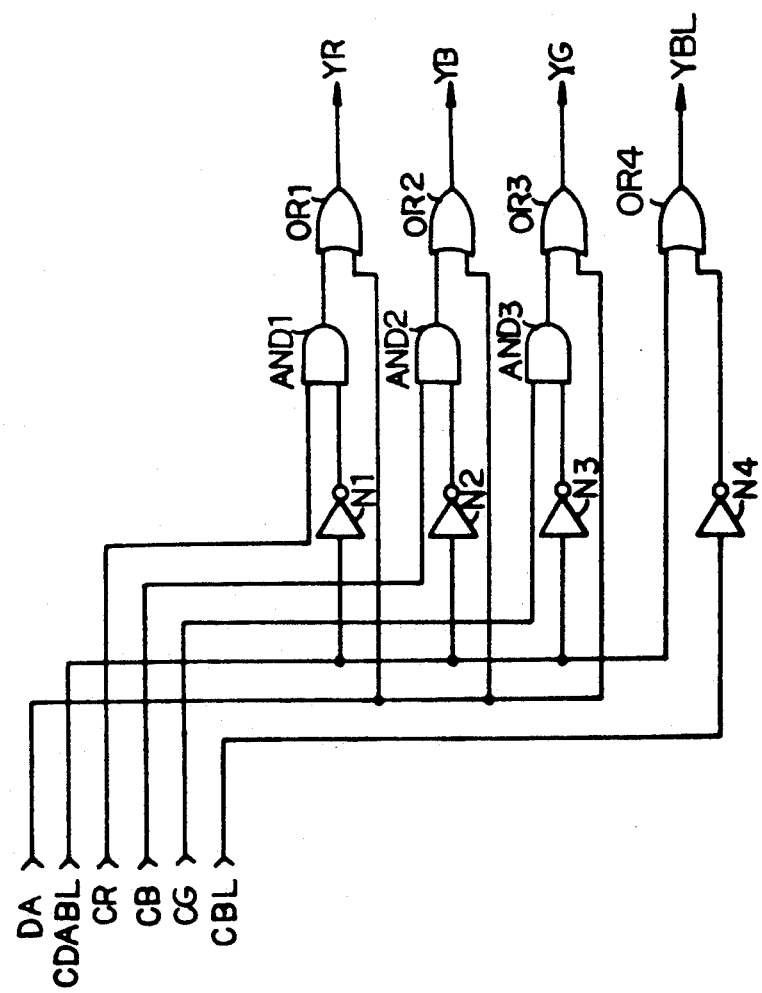
FIG. 3 is a detailed circuit diagram of the superimpsoed video signal generating means of FIG. 2.

Referring to FIG. 3, illustrating the luminance signal generator 223, the generator 223 combines character data signals CDA and CDABL, chrominance signals CR, CB, and CG, and blanking signal CBL of the controller 221 so as to produce output signals YR, YB, YG, and YBL that are represented by the following equations.

$$YR = (CR \cdot \overline{CDABL}) + CDA$$

$$YB = (CR \cdot \overline{CDABL}) + CDA$$

$$YG = (CR \cdot CDABL) + CDA$$

$$YBL = \overline{CBL} + CDABL$$

Figure 4:
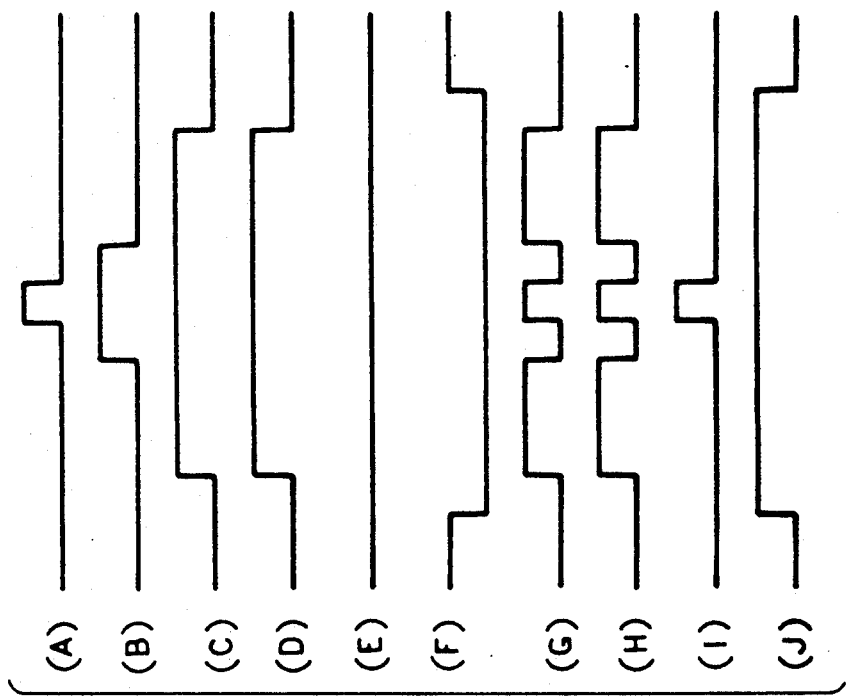
FIG. 4 shows waveforms for illustrating the operation of luminance signal generator shown in FIG. 3.

Referring to FIG. 4, A and B respectively represent the character data signal CDA and character data edge signal CDABL of the CG 300. C-E respectively represent the red, blue and green signals CR, CB and CG produced by the chrominance signal generator 222. F represents the color blank signal CBL produced by the controller 221. G-J respectively represent luminance R, G, B, and blank signals YR, YB, YG, and YBL produced by the luminace signal generator 223.

Figure 5:
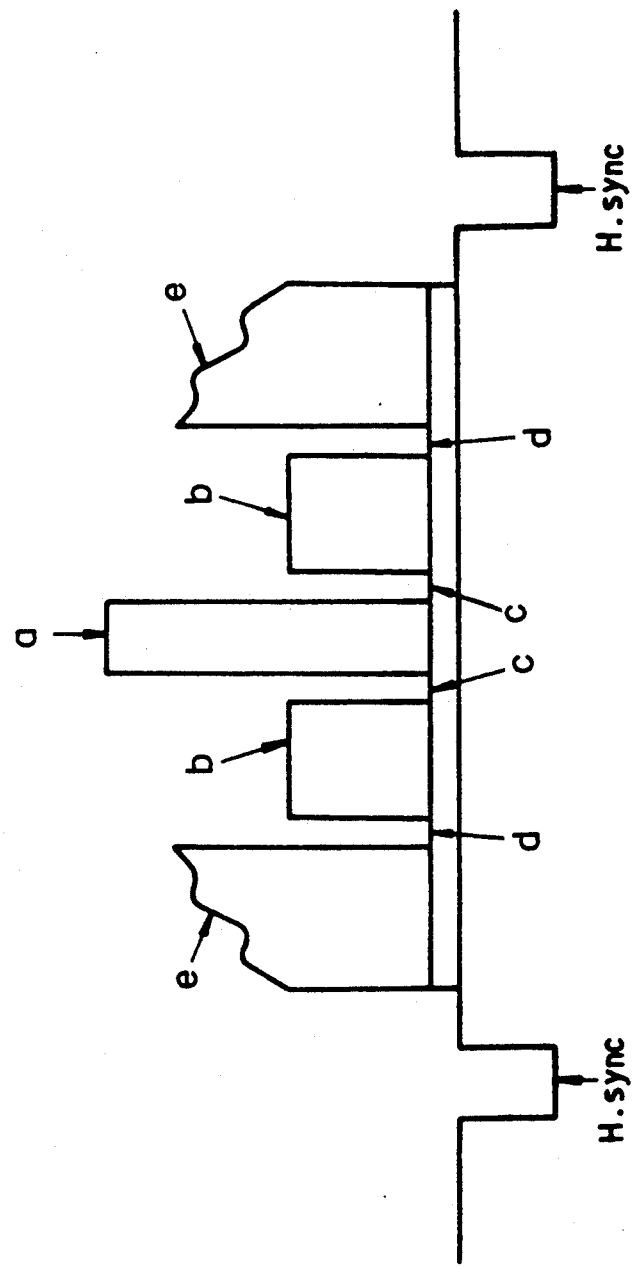
FIG. 5 is a waveform for illustrating the video signal produced by the inventive circuit.

Referring to FIG. 5 for illustrating the waveform of the video signal according to the inventive circuit, (a) represents character signal interval (luminance level of white), (b) superimposed luminace signal interval, (c) blank signal interval for character information, (d) blank signal interval for superimposed information, and (e) the video signal.

Hereinafter, the operation of the inventive circuit will now be described with reference to FIGS. 2 and 4.

If the video signal produced by the video signal processing unit is applied to the controller 221 of the superimposed video signal generator 220, the signal corresponding to the superimposed information per frame is stored into the memory 210.

The video signal of the video signal processing unit is transferred through the mixer MIX1 to the tape recording unit and video displaying unit. At this time if it reaches the superimposing interval corresponding to each frame, the microprocessor transfers a control signal to the controller 221, which in turn applies F signal CBL of FIG. 4 to the mixer MIX1 so as to prevent the video signal of the video signal processing unit from being transferred to the mixer MIX1, and reads out the superimposed information from the memory 210 so as to transfer it to the chrominance generator 222, which in turn applies the output signals C-E as shown in FIG. 4 to the mixer MIX1. Thus, instead of the video signal, the superimposed information corresponding to C-E of FIG. 4 is delivered to the tape recording unit and video displaying unit.

Then the character displaying signals A and B as shown in FIG. 4 of the CG 300 are applied to the luminance signal generator 223 of the logic circuit as shown in FIG. 3 of the superimposed video signal generator 200. In order to display white characters on the screen at the high logic state of the signal A of FIG. 4 by delivering to the luminance signal generator 223 the output signals C-E as shown FIG. 4 of the chrominance signal generator 222 that have the superimposed interval consisting of the high logic state interval of the signal C of FIG. 4, and the blanked color information signal F shown in FIG. 4 of the video signal, the output signals YR, YB, YG (G-I of FIG. 4) of the luminance signal generator 223 must keep high logic state during the high logic state of the signal A of FIG. 4. Further the output signals YR, YB, YG of the luminance signal generator 223 must be low logic state between the high logic edge positions of the waveforms B and A of FIG. 4, and have the same logic state as the output signals CR, CB, CG of the chrominance signal generator 222 during the remaining superimposing interval, so as to produce the edge signal (i.e., blank signal) for emphasizing the displayed characters. The signal J of FIG. 4 blanks the video signal so that the output signal of the luminance signal generator 223 may delivered through the mixer MIX1 to the video displaying unit and tape recording unit.

Thus when there is produced the information corresponding to the character displaying signal and the superimposed video signal per frame, the video signal as shown in FIG. 5 is recorded.

As described above, the superimposed video signal generator according to the present invention may perform the function of processing the recording character signal of the CG information, so that the mixer MIX2 is not required, thus simplifying the circuit construction as well as decreasing noise.

What is claimed is:

1. A circuit for mixing superimposed video signals and character displaying signals, said circuit comprising:

video signal processing means for providing composite video signals;

superimposed video signal generating means for providing superimposed video signals in response to control signals, said composite video signals, and character display signals;

character displaying signal generating means for generating said character display signals;

control means for generating said control signals; and a mixer for selectively providing said composite video signals and said superimposed video signals;

wherein said superimposed video signal generating means comprises:

a controller for providing said composite video signals from said video signal processing means to memory means in response to said control signals from said control means, said memory means for storing said composite video signals and regenerating said composite video signals as stored video signals received by said controller according to said control signals of said control means, chrominance signal generator means for receiving said stored video signals read out from said memory means and receiving color information from said control means through said controller to generate chrominance signals, and luminance signal generator means for receiving said chrominance signals from said chrominance signal generator means and luminance control signals from said controller and mixing said stored video signals and said character display signals from said character displaying signal generating means to generate said superimposed video signals received by said mixer.

2. The circuit according to claim 1, wherein said luminance signal generator means combines character signals CDA and edge signals CDABL from said character displaying signal generating means, chrominance signlas CR, CB, CG from said chrominance signal generator means and blanking signals CBL generated by said controller to generate said chrominance signals Yr, YB, YG, and YBL by the following equations:

$$YR = (CR \cdot \overline{CDABL}) + CDA,$$

$YB = (CR \cdot \overline{CDABL}) + CDA,$ $YG = (CR \cdot \overline{CDABL}) + CDA,$ and $YBL = \overline{CBL} + CDABL.$

* * * * *

UNITED STATES PATENT AND TRADEMARK OFFICE
CERTIFICATE OF CORRECTION

PATENT NO. : 5,227,868
DATED : 13 July 1993
INVENTOR(S) : Wan-Seong Choi

It is certified that error appears in the above-indentified patent and that said Letters Patent is hereby corrected as shown below:

On the Title Page, item 57,

Line 9, change "memory a for storing" to --a memory for storing--;

Column 1,

Line 9, change "tap recorder" to --tape recorder--;

Line 55, delete "output signal";

Column 2,

Lines 29-30 change "superimpsoed" to --superimposed--;

UNITED STATES PATENT AND TRADEMARK OFFICE
CERTIFICATE OF CORRECTION

PATENT NO. : 5,227,868
DATED : 13 July 1993
INVENTOR(S) : Wan-Seong Choi

It is certified that error appears in the above-indentified patent and that said Letters Patent is hereby corrected as shown below:

Column 4,

Line 62,     change "signlas" to --signals--;

Line 64,     change "Yr" to --YR--.

Signed and Sealed this

Second Day of August, 1994

Attest:

BRUCE LEHMAN

*Attesting Officer*     *Commissioner of Patents and Trademarks*